US011481681B2

United States Patent
Wong et al.

(10) Patent No.: US 11,481,681 B2
(45) Date of Patent: Oct. 25, 2022

(54) CLASSIFICATION ROBUST AGAINST MULTIPLE PERTURBATION TYPES

(71) Applicant: Robert Bosch GmbH, Stuttgart (DE)

(72) Inventors: Eric Wong, Lexington, MA (US); Frank Schmidt, Stuttgart (DE); Jeremy Zieg Kolter, Pittsburgh, PA (US); Pratyush Maini, Gurgaon (IN)

(73) Assignees: Robert Bosch GmbH, Stuttgart (DE); CARNEGIE MELLON UNIVERSITY, Pittsburgh, PA (US)

( * ) Notice: Subject to any disclaimer, the term of this patent is extended or adjusted under 35 U.S.C. 154(b) by 341 days.

(21) Appl. No.: 16/857,883

(22) Filed: Apr. 24, 2020

(65) Prior Publication Data

US 2020/0364616 A1    Nov. 19, 2020

(30) Foreign Application Priority Data

May 17, 2019    (EP) .................................... 19175044

(51) Int. Cl.
*G06N 20/00* (2019.01)
*G06F 16/28* (2019.01)

(52) U.S. Cl.
CPC ........... *G06N 20/00* (2019.01); *G06F 16/285* (2019.01)

(58) Field of Classification Search
CPC ............................... G06N 20/00; G06F 16/285
See application file for complete search history.

(56) References Cited

U.S. PATENT DOCUMENTS

| | | | |
|---|---|---|---|
| 11,295,240 B2 * | 4/2022 | Boult | G06N 20/00 |
| 2018/0005070 A1 | 1/2018 | Lin et al. | |
| 2019/0147320 A1 * | 5/2019 | Mattyus | G06V 10/82 |
| | | | 382/155 |
| 2019/0244103 A1 * | 8/2019 | Wang | G06N 3/0454 |

OTHER PUBLICATIONS

Liu, 2016, Elsevier, pp. 74-88.*
Madry, 2017, arXiv, pp. 1-27.*
A. Madry et al., "Towards Deep Learning Models Resistant to Adversarial Attacks", Cornell University, 2019, pp. 1-28. https://arxiv.org/abs/1706.06083.

(Continued)

*Primary Examiner* — Michael I Ezewoko
(74) *Attorney, Agent, or Firm* — Norton Rose Fulbright US LLP; Gerard Messina

(57) ABSTRACT

A system for training a classification model to be robust against perturbations of multiple perturbation types. A perturbation type defines a set of allowed perturbations. The classification model is trained by, in an outer iteration, selecting a set of training instances of a training dataset; selecting, among perturbations allowed by the multiple perturbation types, one or more perturbations for perturbing the selected training instances to maximize a loss function; and updating the set of parameters of the classification model to decrease the loss for the perturbed instances. A perturbation is determined by, in an inner iteration, determining updated perturbations allowed by respective perturbation types of the multiple perturbation types and selecting an updated perturbation that most increases the loss of the classification model.

11 Claims, 6 Drawing Sheets

(56) References Cited

OTHER PUBLICATIONS

E. Wong et al., "Wasserstein Adversarial Examples Via Projected Sinkhorn Iterations", Cornell University, 2019, pp. 1-14. https://arxiv.org/abs/1902.07906.
J. Duchi et al., "Efficient Projections Onto the L1-Ball for Learning in High Dimensions", Proceedings ICML, 2008, pp. 1-8.
http://yann.lecun.com/exdb.mnist/ Downloaded on Apr. 22, 2020.
Florian Tramer et al., "Adversarial Training and Robustness for Multiple Perturbations", Cornell University Library, 201 Olin Library Cornell University Ithaca, NY 14853, 2019, pp. 1-23. XP081268815.

* cited by examiner

CLASSIFICATION ROBUST AGAINST MULTIPLE PERTURBATION TYPES

CROSS REFERENCE

The present application claims the benefit under 35 U.S.C. § 119 of European Patent Application No. EP 19175044.7 filed on May 17, 2019, which is expressly incorporated herein by reference in its entirety.

FIELD

The present invention relates to a system and computer-implemented method for training a classification model, e.g., an image classifier, to be robust against perturbations of multiple perturbation types. The present invention further relates to a system and computer-implemented method for performing a classification robust against perturbations of multiple perturbation types. The present invention further relates to an automotive control system comprising the classification system. The present invention moreover relates to a computer-readable medium comprising instructions to perform a method or parameters parametrizing a classification model.

BACKGROUND INFORMATION

An autonomous device has to make decisions based on the observed environment. This can for example be done by classifying input data, e.g., by identifying a traffic sign as a stop sign. In many cases, such a classification model may be trained based on high-quality data, e.g., obtained in relatively good conditions. In real use, however, the classification model is often applied in less-than-ideal situations. For instance, in image classification, lighting conditions may be different in real life than in the training data, or the picture may be blurred or affected by dirt, rain or snow, etcetera. Since data representing such situations is typically not well-represented in the training dataset, the classification model may be less accurate or predictable in practice than expected. What is more, somebody with malicious intent who has knowledge of the internals of a classification model, may be able to design perturbations that are hard to recognize by humans but still cause misclassifications. It is thus vital to ensure that classification models still work when various kinds of perturbations are applied to their inputs.

In the paper "Towards Deep Learning Models Resistant to Adversarial Attacks" by A. Mądry et al. (available at https://arxiv.org/abs/1706.06083 and incorporated herein by reference), a technique is described for training neural networks that are robust against a so-called "first-order adversary" defining a set of allowed perturbations given by a $\ell_\infty$-ball around the data point. The training of the neural network is performed by minimizing, in an outer optimization, a loss function with respect to perturbed training instances. The perturbed training instances are determined, in an inner optimization, to maximize this loss. The inner optimization is performed using projected gradient descent. The outer optimization problem is performed by applying stochastic gradient descent using the gradient of the loss at the perturbed training instances.

SUMMARY

It is desirable to train classification models to be robust against perturbations of multiple perturbation types. When applying a classifier in practice, for instance, to classify sensor readings of an autonomous device, distortions can stem from different sources and it is therefore vital to be robust with respect to multiple threat models, e.g., perturbation types. For instance, it may be desirable to provide robustness against both sensor noise and motion blur. In particular, it may be needed to provide robustness against a set of perturbations that cannot be described as a bounded convex domain, e.g., a non-convex set. By protecting against multiple perturbation types, for example, decisions of autonomous devices can be made more robust and reliable.

There is a need to improve the training and use of classification models in order to address these and other issues.

In accordance with a first aspect of the present invention, a system for training a classification model to be robust against perturbations of multiple perturbation types is provided. In accordance with another aspect of the present invention, a system for performing a classification robust against perturbations of multiple perturbation types is provided. In accordance with another aspect of the present invention, an automotive control system is provided. In accordance with further aspects of the present invention, computer-implemented methods are provided. In accordance with still further aspects, computer-readable media are provided.

The above aspects of the present invention relate to training a classification model based on a training dataset, and using the classification model to classify an instance. The classification model may be a binary classifier or a multiclass classifier. The classification model may be parametrized by a set of parameters. Various types of classification models are conventional. For instance, the classification model may comprise a neural network, such as a deep neural network, e.g., a neural network comprising an input layer, an output layer, and multiple intermediate layers between the input layer and the output layer. Each layer may comprise one or more nodes. For example, the neural network may have at least 2, 5, 10, 15, 20 or 40 layers, or more, etc. In such a case, the set of parameters of the classification model may comprise weights of one or more nodes of the neural network. However, various other types of classification models can be used, e.g., the classification model may comprise a support vector machine or a random forest. Typically, instances are represented as vectors of numbers, e.g., a vector may represent an image, one or more sensor readings, a sound signal, etc.

In accordance with the present invention, the classification model may be trained to be robust against perturbations of multiple perturbation types. A perturbation type may define a set of allowed perturbations, e.g., given an instance, the perturbation type may define a set of perturbed instances that may be obtained from the instance according to the perturbation type. For example, a $\ell_2$ perturbation type may allow perturbations of points in a $\ell_2$-ball, e.g., according to Euclidean distance, around the point, etcetera. Various other examples are provided throughout.

By training the model to be "robust", and thus obtaining a "robust" model, what is meant is that perturbed instances are increasingly likely to be classified with the label and/or classification of the instances they are perturbed from, when compared with a classification model that has not been trained to be robust. For example, instead of training the classification model to minimize a loss function over training instances, the classification model may be trained to minimize a loss function over perturbed training instances. In that sense, perturbations generally have less effect on classifications by the model.

It will be understood that robustness is a global property in the sense that not all perturbations may be classified correctly, and, for particular instances of the training dataset, perturbed instances of that instance may actually be less likely to be classified correctly. Indeed, like a classification model more generally, a robust classification model may be regarded as an abstraction of the training dataset selected to optimize overall performance.

In accordance with the present invention, in order to train the classification model to be robust, the training may comprise minimizing a loss of the classification model for training instances perturbed according to the multiple perturbation types, e.g., by perturbations that are allowed by at least one of the multiple perturbation types. Thus, effectively, the classification model may be trained with respect to a union of the sets of allowed perturbations of the respective perturbation types, e.g., a union of balls according to multiple norms. The loss typically indicates a difference between outputs predicted by the classification model, e.g., for perturbed training instances, and output labels given by the training dataset. For example, the loss function may comprise a cross-entropy, an $\ell_1$ loss, a Kullback-Leibler divergence, etcetera. The minimization of the loss function may be heuristic and/or may arrive at a local minimum.

Minimizing the loss of the classification model may be performed by iteratively selecting a set of training instances of the training dataset, e.g., a minibatch; determining one or more perturbations for perturbing the set of selected training instances; and updating the set of parameters to decrease the loss of the classification model for the perturbed selected training instances. For example, each selected training instance may be perturbed by the same perturbation or by a separate perturbation. The one or more perturbations may be selected to maximize a loss of the classification model for the set of selected training instances when perturbed by the one or more perturbations. Thus, effectively, backpropagation through the robust optimization problem of minimizing a maximum loss over perturbed training instances, may be performed by solving the inner maximization problem and then backpropagating through the solution. For example, the inner maximization problem may be solved by projected steepest ascent and the outer minimization problem may be solved by stochastic gradient descent.

Interestingly, in the inner maximization, a perturbation may be determined by determining updated perturbations allowed by respective perturbation types, and selecting an updated perturbation that most increases the loss of the classification model. For instance, an updated perturbation and resulting loss may be determined for each perturbation type, and an updated perturbation chosen that most increases the loss. By selecting an updated perturbation according to a perturbation type in an inner iteration, effectively, the different threat models may be incorporated at the level of the steepest descent operation. For example, instead of generating perturbations for single perturbation types, one perturbation may be generated for several perturbation types, e.g., the worst-case loss may be maximized over multiple threat models. This procedure, which the inventors found to be particularly advantageous, is referred to throughout as "multi steepest descent", or MSD.

It is not strictly necessary to determine updated perturbations allowed by respective perturbation types and make a selection therefrom in an inner iteration. For example, it is also possible to, in the outer iteration, determine independent perturbations for the various perturbation types, e.g., independently for each perturbation type; select a perturbation that most increases the loss of the classification model; and optimize the loss for the selected perturbation. In that sense, a worst-case perturbation may be chosen. Instead of selecting one perturbation, it may also be possible to optimize the loss for a combination of perturbations according to multiple perturbation types, e.g., the adversarial perturbations may be used to form a larger adversarial dataset. However, as mentioned, embodiments based on multi steepest descent have been found to be particularly advantageous.

Accordingly, the various measures in accordance with the present invention described above may enable the training of a robust classifier: perturbations of the multiple perturbation types have less effect on classifications, leading to the classifications being more robust and reliable. Interestingly, classification models trained using the techniques described herein may not only provide better robustness against a given perturbation type compared to classification models trained without robustness or trained to be robust against another perturbation type. Actually, in various cases, classification models trained using the techniques described herein have been found to be just as robust, or even more robust, against a particular perturbation types than classification models specifically trained to be robust against that particular type using the techniques of Mądry et al. For example, this has been observed for $\ell_\infty$-type, $\ell_1$-type, and $\ell_2$-type attackers on the MNIST dataset, as discussed in more detail later.

Moreover, the desired level of robustness can be controlled through the definitions of the perturbation types, e.g., by choosing a larger or smaller bound for a perturbation type defined by a norm, etcetera. The techniques described herein are applicable to a wide range of classification models and corresponding types of instances, for example, not only greyscale images but also colour images or other types of sensor data, e.g., an instance may comprise video, radar, LiDAR, motion, or ultrasonic sensor data; any type of data that can be classified by a neural network, etcetera.

Optionally, determining the one or more perturbations for perturbing the set of selected training instances comprises determining a respective perturbation for perturbing each respective selected training instance, and/or comprises determining a single perturbation for perturbing the selected training instances. In the first case, a perturbation may be determined that maximizes the loss for each respective training instance. This is referred to as the "strong version" of MSD. The strong version may provide the best improvement to the classification model. In the second case, a perturbation may be determined that maximize the loss for the multiple training instances, e.g., that, when the same perturbation is applied to each respective training instance, the overall loss over the multiple training instances is maximized. This is referred to as the "weak version" of MSD. The weak version may be more resource-efficient.

The strong and weak versions may be combined, e.g., the strong version may be applied in one or more iterations and the weak version may be applied in one or more other iterations. Also, a number of perturbations may be determined that is in between the single perturbation of the weak version and the number of selected training instances of the strong version, providing a trade-off between computational resources spent and progress made per outer iteration.

Optionally, the processor subsystem is configured to train the classification model by performing at least one or more first outer iterations followed by one or more second outer iterations. A single perturbation may be selected in each first outer iteration and a respective iteration for each training instance may be determined in each second outer iteration. This way, particularly efficient progress can be made in the first outer iterations, after which the second outer iterations can be used to fine-tune the set of parameters. This may allow to reach a high-quality set of parameters in relatively few iterations.

Optionally, the processor subsystem is configured to determine an updated perturbation allowed by a respective perturbation type by determining an update to the perturbation to increase the loss of the classification model for the set of training instances, and projecting the perturbation updated with said update to the set of allowed perturbations of the perturbation type. This way, the permutation can be updated in a direction most suitable to increase the loss of the classification model, while it is still assured that the resulting perturbation is allowed by the perturbation type.

Optionally, the processor subsystem is configured to determine the update to the perturbation by gradient ascent or steepest ascent. Gradient ascent allows to determine a direction that is particular suitable to increase the loss. The use of steepest ascent can be particularly advantageous in cases where the gradients are relatively small, for example, at the training instances themselves. In such cases, steepest ascent allows to make particularly efficient progress.

Optionally, a perturbation type of the multiple perturbation types is defined by a norm and a bound, e.g., a radius. The set of allowed perturbations of the perturbation type may be comprised in the set of perturbations for which the norm does not exceed the bound. Norm-bounded perturbations allow to express various meaningful types of perturbations, while also allowing to determine updated perturbations for increasing the loss function relatively efficiently, e.g., for various norms it is possible to efficiently apply gradient ascent or steepest ascent, and/or to project perturbations to the set of allowed perturbations defined by the norm and bound. For example, the norm may comprise a $\ell_0$ norm, a $\ell_1$ norm, a $\ell_2$ norm, or a $\ell_\infty$ norm. The $\ell_0$ norm may define a set of allowed perturbation types specifying a maximum number of entries of an instance to be perturbed. The $\ell_1$ norm may specify a maximum to the sum of modifications to the entries of the instance. The $\ell_2$ norm may specify a maximal Euclidean distance between the instance and its perturbation. The $\ell_\infty$ norm may specify a maximal modification to be applied to each instance.

Optionally, a perturbation type of the multiple perturbations is defined by a maximal Wasserstein distance. For example, the set of allowed perturbations of the perturbation type may be comprised in the set of perturbations of instances for which the Wasserstein distance to the instance does not exceed the maximal Wasserstein distance. The Wasserstein distance may in various settings define a meaningful set of perturbations, e.g., in the image classification setting, the Wasserstein distance may be regarded as measuring the cost of moving pixel mass, e.g., the set of allowed perturbations may comprise scaling, rotation, translation, and/or distortion. Wasserstein adversarial examples may be generated using conventional techniques, such as those described in in E. Wong et al., "Wasserstein Adversarial Examples via Projected Sinkhorn Iterations" (incorporated herein by reference and available at https://arxiv.org/abs/1902.07906).

Optionally, the classification model is an image classifier. The training dataset may comprise multiple training images as training instances. Various types of conventional image classifiers may be applied, e.g., convolutional neural networks or other types of neural networks. As discussed, image classification is an important building block, e.g., for various autonomous devices and hence, improving their robustness and reliability particularly in adversarial settings is particularly salient.

Optionally, the processor subsystem is configured to determine a perturbation by, in the inner iteration, determining a classification of a training instance perturbed by an updated perturbation, and to determine the perturbation as the updated perturbation if the classification of said perturbed training instance is different from a classification of the training instance. In other words, determining the perturbation may be cut short if it is found that the perturbed instance is classified differently. This way, less optimization operations for determining the perturbation are needed, which may lead to an overall improvement in performance compared to performing additional iterations in order to arrive at an updated perturbation, even if continuing the optimization may lead to a more optimal choice of parameters.

Various embodiments relate to a system performing a classification robust against perturbations of multiple perturbation types, for example, as a subsystem of an automotive control system for controlling a vehicle. In such a case, the automotive control system may obtain images of the environment of the vehicle from a camera, classify them, and use them to determine actuator data to cause an actuator to effect an action to control the vehicle. Use of image classification in automotive control systems is conventional. Given the high demands for safety and reliability, the unpredictability of the environment in which vehicles can operate, and also the desirability to be resistant both against adversarial and non-adversarial perturbations, the techniques presented herein are particularly advantageous in such settings.

Classification using a classification model as described herein may more generally be applied to compute control signals for controlling a wide range of physical systems, including computer-controlled machine such as robots, domestic appliances, power tools, manufacturing machines, construction plants, personal assistants or access control systems. Generally, a control signal for controlling such a physical system may be determined at least in part based on a classification of a sensor reading using a classification model as described herein in order to make decisions based on the perceived environment.

In various embodiments, the system that performs the classification may not directly generate a control system itself, but may interact with a physical system more indirectly. In an embodiment, the system performing the robust classification may be comprised in an optical inspection system, e.g., for inspecting products produced in a manufacturing process or similar. For example, images of manufactured product may be classified into faulty or non-faulty, and/or into a predetermined set of anomalies, etc. Although it is possible for such an optical inspection system to directly control the physical system, e.g., adjust control parameters of the manufacturing system/construction plant, this is not needed, e.g., the optical inspection system may also flag products for manual inspection depending on the determined classification, may pass determined classifications on to a separate control system of the physical system, etc.

It will be appreciated by those skilled in the art that two or more of the above-mentioned embodiments, implementations, and/or optional aspects of the present invention may be combined in any way deemed useful.

Modifications and variations of any computer-implemented method and/or any computer readable medium, which correspond to the described modifications and variations of a corresponding system, can be carried out by a person skilled in the art on the basis of the present description.

BRIEF DESCRIPTION OF THE DRAWINGS

These and other aspects of the present invention will be apparent from and explained below with reference to the embodiments described by way of example in the description below and with reference to the figures.

DETAILED DESCRIPTION OF EXAMPLE EMBODIMENTS

Figure 1:
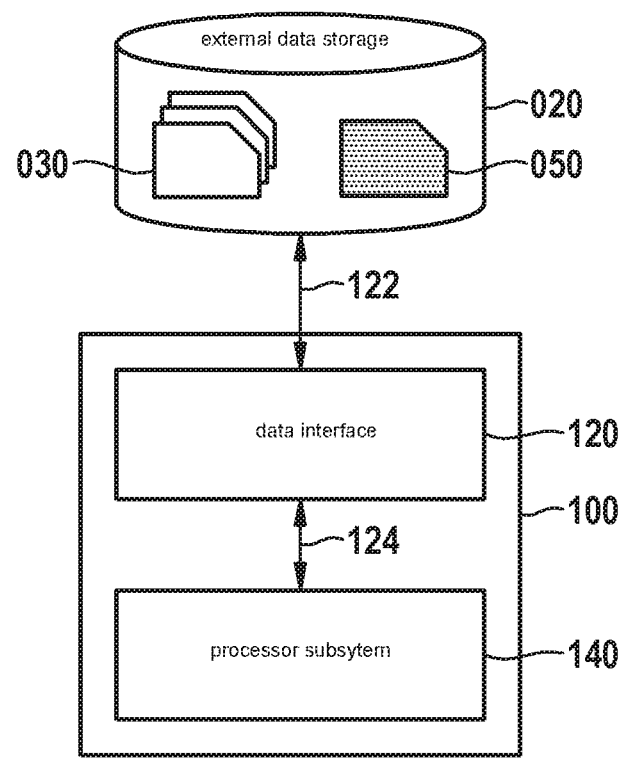
FIG. 1 shows a system for training a classification model to be robust against perturbations of multiple perturbation types.

It should be noted that the figures are purely diagrammatic and not drawn to scale. In the figures, elements which correspond to elements already described may have the same reference numerals.

FIG. 1 shows an example system 100 for training a classification model to be robust against perturbations of multiple perturbation types. A perturbation type may define a set of allowed perturbations. The system 100 may comprise a data interface 120 and a processor subsystem 140 which may internally communicate via data communication 124. The processor subsystem 140 may be configured to, during operation of the system 100 and using the data interface 120, access a training dataset 030 and a set of parameters 050 parametrizing the classification model. Training dataset 030 may comprise multiple training instances. For example, as shown in FIG. 1, the data interface 120 may provide access 122 to an external data storage 020 which may comprise said data 030, 050. Alternatively, the data 030, 050 may be accessed from an internal data storage which is part of the system 100. Alternatively, the data 030, 050 may be received via a network from another entity. In general, the data interface 120 may take various forms, such as a network interface to a local or wide area network, e.g., the Internet, a storage interface to an internal or external data storage, etc. The data storage 020 may take any conventional and suitable form.

The processor subsystem 140 may be further configured to, during operation of the system 100, train the classification model. Training the classification model may comprise performing one or more outer iterations. Processor subsystem 140 may be configured to, in an outer iteration, select a set of training instances of training dataset 030. Processor subsystem 140 may be configured to, in an outer iteration, determine one or more perturbations for perturbing the one or more selected training instances. The one or more perturbations may be selected among the sets of allowed perturbations of the multiple perturbation types to maximize a loss of the classification model for the set of selected training instances when perturbed by the perturbation. Processor subsystem 140 may also be configured to, in an outer iteration, updating the set of parameters 050 of the classification model to decrease the loss of the classification model for said perturbed one or more selected training instances Processor subsystem 140 may be configured to determine a perturbation by, in an inner iteration, determining updated perturbations allowed by respective perturbation types of the multiple perturbation types and selecting an updated perturbation that most increases the loss of the classification model.

As an optional component, the system 100 may comprise an image input interface (not shown) or any other type of input interface for obtaining sensor data from a sensor, such as a camera (not shown). Processor subsystem 140 may be configured obtain one or more training instances of the training dataset as sensor data obtained from the sensor.

Various details and aspects of the operation of the system 100 will be further explained with reference to FIG. 4, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA). In general, each functional unit of the system may be implemented in the form of a circuit. It is noted that the system 100 may also be implemented in a distributed manner, e.g., involving different devices or apparatuses, such as distributed servers, e.g., in the form of cloud computing.

Figure 2:
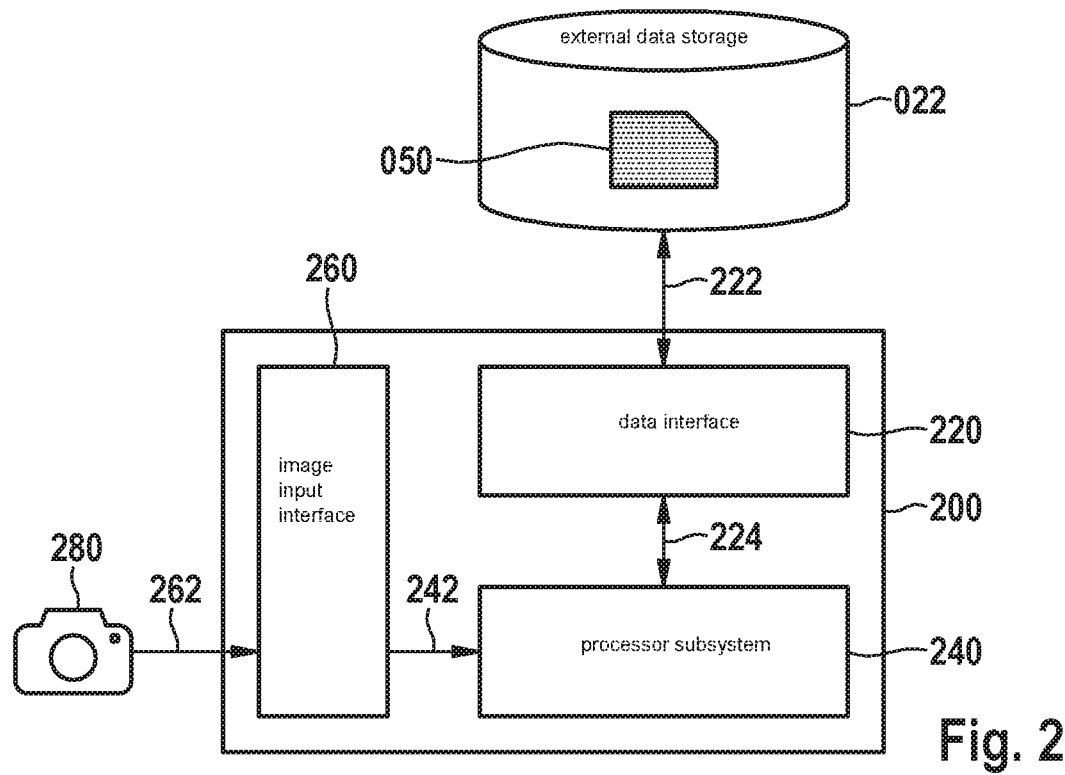
FIG. 2 shows a system for performing a classification robust against perturbations of multiple perturbation types.

FIG. 2 shows a system 200 for performing a classification robust against perturbations of multiple perturbation types. A perturbation type may define a set of allowed perturbations. The system 200 may comprise a data interface 220 and a processor subsystem 240 which may internally communicate via data communication 224. The processor subsystem 240 may be configured to, during operation of the system 200 and using the data interface 220, access a set of parameters 050 parametrizing a classification model. The set of parameters may be trained according to a method described herein, e.g., by system 100. For example, as shown in FIG. 2, the data interface 220 may provide access 222 to an external data storage 022 which may comprise said set of parameters 050. Alternatively, the set of parameters 050 may be accessed from an internal data storage which is part of the system 200. Alternatively, the set of parameters 050 may be received via a network from another entity. In general, the data interface 220 may take various forms, such as a network interface to a local or wide area network, e.g., the Internet, a storage interface to an internal or external data storage, etc. The data storage 022 may take any conventional and suitable form.

The processor subsystem 240 may be further configured to, during operation of the system 200, obtain an instance and classify the instance according to the classification model based on the set of parameters 050.

As an optional component, the system 200 may comprise an image input interface 260 or any other type of input interface for obtaining sensor data from a sensor, such as a camera 280. The sensor data may be comprised in the instance to be classified. For example, the camera may be configured to capture image data 262, processor subsystem 240 being configured to obtain the instance from image data 262 obtained via input interface 260.

As an optional component, the system 200 may comprise an actuator interface (not shown) for providing, to an actuator, actuator data causing the actuator to effect an action in an environment of system 200. For example, processor subsystem 240 may be configured to determine the actuator data based at least in part on the classification of the instance, and to provide the actuator data to the actuator via the actuator interface.

Various details and aspects of the operation of the system 200 will be further explained with reference to FIG. 4, including optional aspects thereof.

In general, the system 200 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA). In general, each functional unit of the system may be implemented in the form of a circuit. It is noted that the system 200 may also be implemented in a distributed manner, e.g., involving different devices or apparatuses, such as distributed servers, e.g., in the form of cloud computing.

Figure 3:
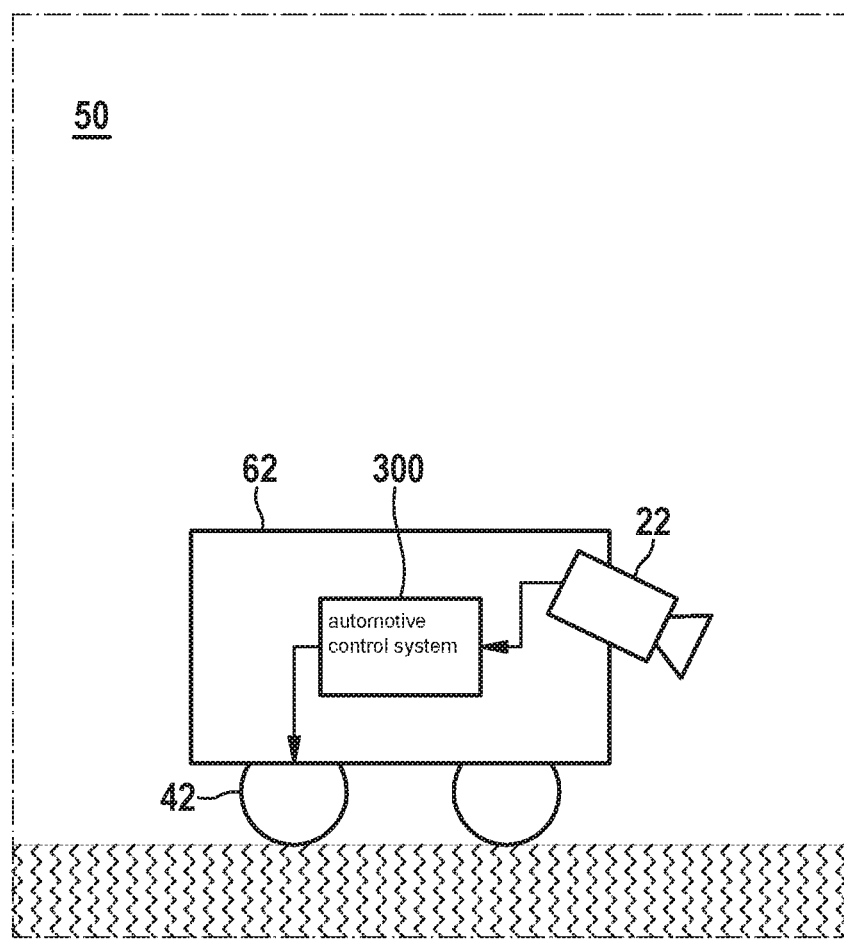
FIG. 3 shows an automotive system for controlling a vehicle.

FIG. 3 shows an example of the above, in that an automotive control system 300 for controlling a vehicle 62 is shown that comprises a system for performing a classification using a classification model according to an embodiment, e.g., system 200 of FIG. 2 (not shown separately). The classification model may be an image classifier in this example. Vehicle 62 may be an autonomous or semi-autonomous vehicle, but this is not necessary, e.g., system 300 can also be a driver-assistance system of a non-autonomous vehicle 62.

For example, vehicle 62 may incorporate the classification system to control the vehicle based on images obtained from a camera 22. For example, automotive control system 300 may comprise a camera interface (not shown separately) for obtaining an image of an environment 50 of the vehicle from the camera 22.

The classification system may be configured to classify the image obtained from camera 22 according to the classification model to detect an object in the environment 50 of the vehicle, for example, a traffic sign or an obstacle with which the vehicle is at risk of colliding. In an embodiment, at least one of the multiple perturbations is defined by a maximal Wasserstein distance; given the unpredictability of vehicle environments and the possibility of perturbations such as partial rotations, partial translations, motion blur, sensor smearing, etc., the use of such a perturbation type can especially help to improve reliability of the classification and thus improve car control and/or safety.

Control system 300 may further comprise an actuator interface (not shown separately) for providing, to an actuator, actuator data causing the actuator to effect an action to control vehicle 62. Automotive control system 300 may be configured to determine actuator data to control vehicle 62 based at least on part on this detection; and to provide the actuator data to the actuator via the actuator interface. For example, the actuator may be caused to control steering and/or braking of the vehicle. For example, the control system may control an electric motor 42 to perform (regenerative) braking in case an obstacle is detected.

Figure 4:
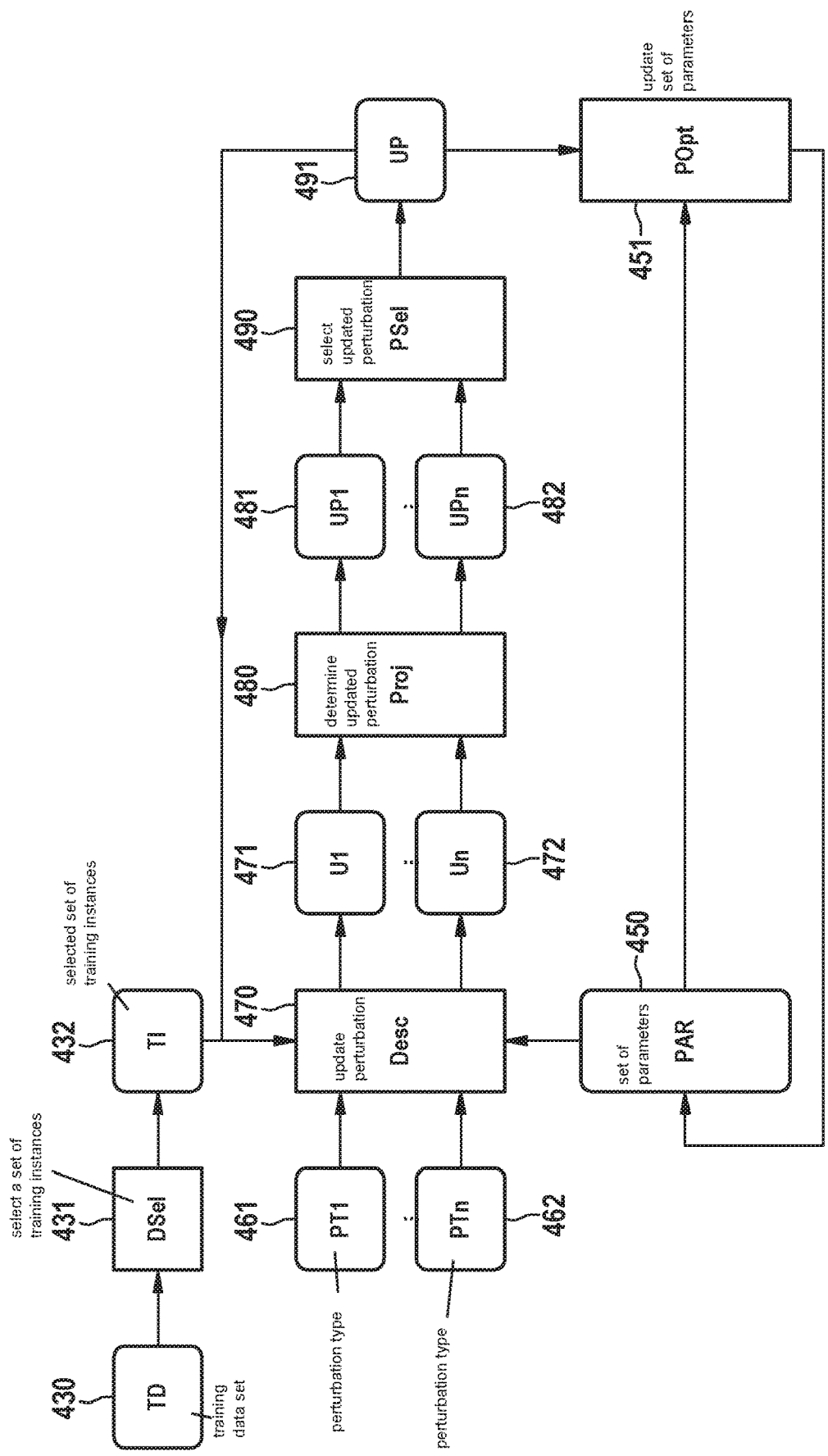
FIG. 4 shows a detailed example of how a classification model may be trained using a perturbation allowed by one of multiple perturbation types.

FIG. 4 shows a detailed yet non-limiting example of how a classification model may be trained to be robust against perturbations of multiple perturbation types. Training a classification model to be robust against perturbations may also be referred to as "adversarial training", whereas perturbations according to a perturbation type may also be referred to as "attacks" by an "adversary".

In this example, the classification model is a neural network, but various other types of classification model may also be used. The classification model may be parameterized by a set of parameters PAR, 450, for example, multiple parameters. For example, in the case of a neural network, set of parameters PAR may comprise weights of one or more nodes of the neural network. The set of parameters may comprise additional parameters, e.g., hyperparameters, model selection parameters, etc. Mathematically, a classification model parametrized by a set of parameters $\theta$, PAR may be denoted as a function $f_\theta$. Given an instance $x_i$, value $f_\theta(x_i)$ may represent one or more classification scores indicating probabilities that the instance $x_i$ belongs to respective classes according to the classification model, e.g., one such probability for a binary classifier or multiple probabilities for a multiclass classifier.

Training the classification model typically comprises determining set of parameters PAR based on a training dataset TD, 430. Training dataset TD may comprise multiple training instances (not shown separately), for example, at most or at least 1000, at most or at least 10000, or at most or at least 100000 training instances. The training instances are typically labelled instances $\{x_i, y_i\}_{i=1,\ldots,n}$, e.g., a training instance may comprise a feature vector $x_i$, e.g., a real-valued vector, and a label $y_i$, e.g., a binary or otherwise categorical label. In some embodiments, the training instances comprise sensor data, e.g., images or video obtained from a camera, radar data, LiDAR data, ultrasonic data, motion data, etc. In particular, in some embodiments, the classification model is an image classifier, and training dataset TD comprises multiple training images as training instances. For example, a feature of a training image may represent a pixel value of the training image. The classification model can, e.g., in case of image classification, be a convolutional neural network or other suitable type of neural network.

Training the classification model may involve minimizing a loss of the classification model for a set of instances.

Generally, a loss for a set of instances $\{x_i\}$ with respective labels $y_i$ indicates an accuracy of the classification model in classifying the one or more instances with their respective labels. The loss may be given by a loss function, e.g., a function $\ell(p_i, y_i)$ of classification scores $p_i$ of the classification model for the instance and labels $y_i$. Various conventional loss functions can be used, e.g., cross-entropy, mean absolute error, etc. For example, in the case of binary classification, the cross-entropy loss may be defined as $\ell(p_i, y_i) = -(y_i \log(p_i) + (1-y_i)\log(1-p_i))$. In the case of a multiclass classifier, for example, the loss may be determined based on probability $p_i'$ of the instance being classified by label $y_i$ according to a softmax distribution over classification scores $p_i$. For multiple instances, the loss may be defined as the sum of the losses of the respective instances, for example. Throughout, notation $\ell(x_i + \delta; \theta) := \ell(f_\theta(x_i + \delta), y_i)$ may be used to denote a loss of the classification model for an instance $x_i$ with label $y_i$.

The classification model of FIG. 4 may be trained to be robust against perturbations of multiple perturbation types. Shown in the figure are perturbation types PT1, 461 up to PTn, 462. The number of perturbation types can for example be at least two, at least three, or at most or at least five. A perturbation type may define a set of allowed perturbations.

In various embodiments, one or more perturbation types, e.g., perturbation type PT1, may be defined by a norm and a bound $\epsilon$. The set of allowed perturbations of the perturbation type may be comprised in the set of perturbations for which the norm does not exceed the bound. For example, the norm may be an $\ell_p$-norm, e.g., a $\ell_0$ norm, a $\ell_1$ norm, a $\ell_2$ norm, or a $\ell_\infty$ norm, in which case the set of allowed perturbations may be defined as $\Delta_{p,\epsilon} = \{\delta : \|\delta\|_p \le \epsilon\}$. Perturbation types given by $\ell_p$ norms capture various natural sets of allowed perturbations. Throughout, sets of allowed perturbation may be denoted generally as $\Delta_{p,\epsilon}$ with the understanding that this notation also encompasses perturbation types that are not necessarily defined by a norm and a bound.

Instead or in addition of $\ell_p$-type perturbations, one or more perturbation types of the multiple perturbations, e.g., perturbation type PTn, may be defined by a maximal Wasserstein distance $\epsilon$, e.g., allowing to capture scaling, rotation, translation, and/or distortion of images or other types of sensor data. The Wasserstein distance may be as defined in E. Wong et al., "Wasserstein Adversarial Examples via Projected Sinkhorn Iterations" (incorporated herein by reference insofar as concerning the definition of the Wasserstein distance in section 3, and available at https://arxiv.org/abs/1902.07906).

Training the classification model to be robust against perturbations of multiple perturbation types may comprise minimizing, e.g., heuristically, a loss for perturbed instances of training dataset TD, wherein the perturbed instances are perturbed to maximize the loss among the perturbations allowed by the multiple perturbation types. Mathematically, the optimization may be phrased as:

$$\min_\theta \sum_i \max_{\delta \in \Delta} \ell(f_\theta(x_i + \delta), y_i) \qquad (*)$$

Here, $\{x_i, y_i\}_{i=1,\ldots,n}$ denote training dataset TD; $\ell$ denotes the loss function; and $\Delta$ denotes the set of perturbations allowed by at least one perturbation type PTi, in other words, the union of the sets of perturbations allowed by the respective perturbation types PT1, ..., PTn. The set $\Delta$ is sometimes also called a "perturbation region" or "threat model".

As shown in FIG. 4, the above loss may be heuristically minimized, and hence the classification model may be trained, in an iterative fashion, e.g., in multiple iterations. For example, the number of such outer iterations may be at most or at least 5, or at most or at least 10. In an outer iteration, in operation DSel, 431, a set of training instances TI, 432, may be selected. Perturbation(s) UP, 491 for perturbing training instances TI may be selected among the set of allowed perturbations of the multiple perturbation types to maximize a loss of the classification model for training instances TI. In the example of FIG. 4, this selection comprises operations Desc., 470; Proj., 480; and PSel, 490 which may be repeated in an inner iteration. Based on selected perturbation(s) UP, set of parameters PAR may be updated in an operation POpt, 451, to decrease the loss of the classification model for the training instances TI perturbed by perturbation UP.

In other words, training the classification model may comprise backpropagating training instances through the optimization problem, wherein a training instance may be backpropagated by solving the inner maximization to obtain updated perturbation(s) UP and backpropagating the perturbed input instance through the outer optimization. It is noted that this approach may be supported by Danskin's theorem, which states that the gradient of a maximization problem is equal to the gradient of the objective evaluated at the optimum. Applied to expression (*), this theorem may imply that $$\nabla_\theta \sum_i \max_{\delta \in \Delta} \ell(f_\theta(x_i + \delta), y_i) = \sum_i \nabla_\theta \ell(f_\theta(x_i + \delta^*(x_i)), y_i),$$

$$\text{where } \delta^*(x_i) = \underset{\in \delta \Delta}{\operatorname{argmax}} \ell(x_i + \delta; \theta)$$

represents a worst-case adversarial loss over the multiple perturbation types. In various embodiments further described below, solving the inner maximization problem may comprise determining updated perturbation(s) UP by projected gradient descent or similar.

Focusing now on an outer iteration, in operation DSel, 431, a set of training instances TI, 432, of training dataset TD may be selected. Set of training instances TI may be a minibatch of a stochastic optimization, e.g., stochastic gradient descent or similar. For instance, the number of training instances may be at most or at least 10, or at most or at least 100. Training instances TI may be selected in various conventional ways for gradient descent or similar methods, e.g., randomly, sequentially, etc. However, it is also possible for set of training instances TI to comprise the full dataset TD or consist of a single training instance.

Given set of training instances TI, one or more perturbations UP, 491, may be determined for perturbing the set of selected training instances.

Shown in the figure by way of example is a single permutation UP for perturbing each of the selected training instances TI. Using a single iteration may be referred to as the weak version of multi steepest descent. In other embodiments, a respective perturbation for perturbing each respective selected training instance is determined, which may be referred to as the strong version of multi steepest descent. Other choices are also possible, e.g., a perturbation for a subset of set TI of training instances, etc. In various embodiments, in one or more first outer iterations, a single perturbation UP may be determined and in one or more later second outer iterations, a perturbation UP may be determined for each selected training instance TI. For example, a single second outer iteration may be performed, e.g., as a final operation of the optimization. The number of first outer iterations may be, for example, at most or at least 5, or at most or at least 10.

Generally, perturbations UP may be selected among the sets of allowed perturbations of the multiple perturbation types PT1, . . . , PTn to maximize a loss of the classification model for training instances TI when perturbed by perturbations UP.

As shown in FIG. 4, perturbations UP may themselves be determined in an inner iterative optimization. For example, the number of iterations of the inner optimization may be at most or at least 50, at most or at least 100, or at most or at least 200. The example shows the weak version of MSD which results in a single perturbation UP, but more perturbations may be determined for respective training instances, e.g., by repeatedly performing operations 470-490. In an inner iteration, updated perturbation UP for one or more of the training instances TI may be determined by determining updated perturbations UP1, 481, . . . , UPn, 482 for those training instances by respective perturbation types PT1, . . . , PTn, for example, an updated perturbation $\delta_p^{(t+1)}$, UPi, for each perturbation type p∈S, PTi. It is not strictly possible to consider each perturbation type in each inner iteration, but each perturbation type PT1, . . . , PTn of the multiple perturbation types may be considered in at least one inner iteration, and in various embodiments, in at least one inner iteration, multiple perturbation types are considered. In such a case, a selection PSel, 490, may be made of an updated perturbation UP1, . . . , UPn that most increases the loss of the classification model, e.g., updated perturbations that more increase the loss of the classification model are favoured over updated perturbations that less increase the loss. For example, updated perturbation UP may be selected among updated perturbations UP1, . . . , UPn as $$\delta^{(t+1)} = \operatorname*{argmax}_{\delta_p^{(t+1)}} \Sigma_i \ell(x_i + \delta_p^{(t+1)}),$$

e.g., as perturbation that maximizes a loss over one or more selected training instances of applying the perturbation. For example, the sum may be over the selected training instances in the weak version or over a single training instance in the strong version.

In operation Desc., 470, to determine an updated perturbation UPi allowed by a perturbation type PTi, a respective update U1, 471, . . . , Un, 472 to the perturbation UP may be determined to increase the loss of the classification model for the set of training instances TI. The update to current perturbation $\delta^{(t)}$ may be denoted $v_p(\delta^{(t)})$, e.g., resulting in updated perturbation $\delta^{(t)} + v_p(\delta^{(t)})$. For example, $v_p(\delta^{(t)})$ may be determined to increase the current loss $\Sigma_i \ell(x_i + \delta^{(t)})$.

In some embodiments, operation Desc. may comprise updating the perturbation by gradient descent or ascent, e.g., by updating the perturbation in the gradient direction to increase the loss.

In some embodiments, operation Desc. may comprise updating the perturbation by steepest ascent, e.g., steepest descent, for increasing the loss. Especially at training instances TI themselves, e.g., if δ=0, steepest ascent may provide larger and therefore more effective updates than gradient ascent. Mathematically, an updated perturbation UPi determined by steepest ascent with respect to a norm $\|\cdot\|_p$ and step size α may be given by $$v_p(\delta^{(t)}) = \operatorname*{argmax}_{\|v\|_p \leq \alpha} v^T \nabla l(x + \delta^{(t)}; \theta).$$

Techniques to determine the steepest ascent with respect to various norms are conventional and may be applied here.

As an illustrative example, an update Ui to a perturbation with respect to the $\ell_\infty$ norm may be determined as $v_\infty(x) = \alpha \cdot \operatorname{sign}(\nabla(x+\delta^{(t)}; \theta))$. An update to a perturbation with respect to the $\ell_2$ norm may be determined as $$v_2(\delta) = \alpha \cdot \frac{\nabla \ell(x + \delta; \theta)}{\|\nabla \ell(x + \delta; \theta)\|_2}.$$

An update to a perturbation with respect to the $\ell_1$ norm may be determined as $$v_1(\delta) = \alpha \cdot \operatorname{sign}\left(\frac{\partial \ell(x + \delta; \theta)}{\partial \delta_{i^*}}\right) \cdot e_{i^*}$$

where $$i^* = \operatorname{argmax} |\nabla \ell(x + \delta; \theta)_i|$$

and $e_{i^*}$ is a unit vector with a one in position i*. Various alternatives will be apparent to the skilled person.

In case the perturbation type PTi for which to determine an updated perturbation UPi is defined by a $\ell_p$-norm, steepest ascent may be performed with respect to the same norm. However, this is not strictly necessary. In the case of a perturbation type defined by a maximal Wasserstein distance, the updated perturbation may be determined by steepest ascent with respect to the Wasserstein distance, or with respect to a $\ell_\infty$ norm, for example. It is possible to use the same update Ui to determine multiple updated perturbations UPi, e.g., by using different projections as detailed below.

Figure 5:
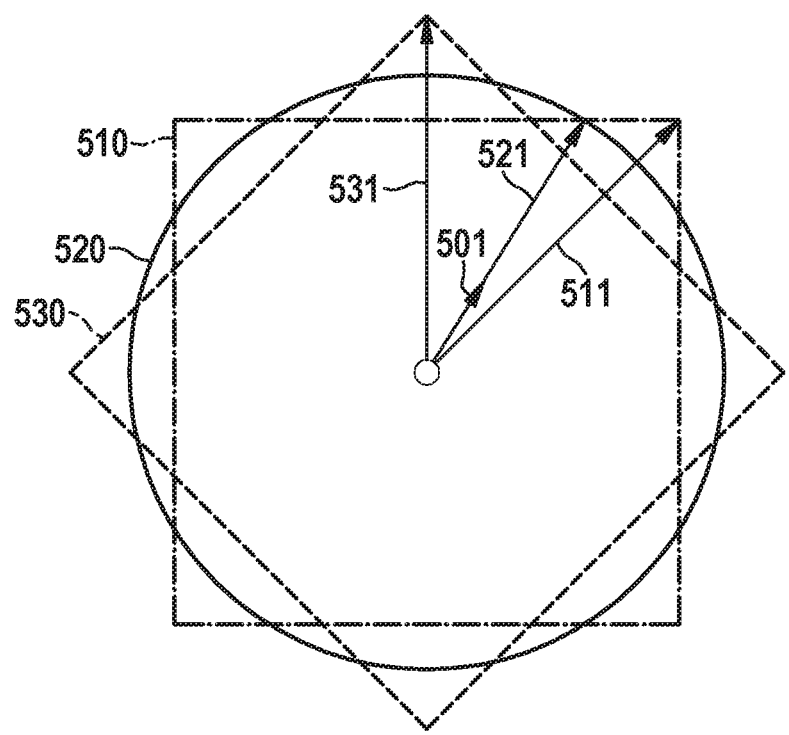
FIG. 5 shows a detailed example of how to determine an update to a perturbation by steepest ascent.
Figure 6:
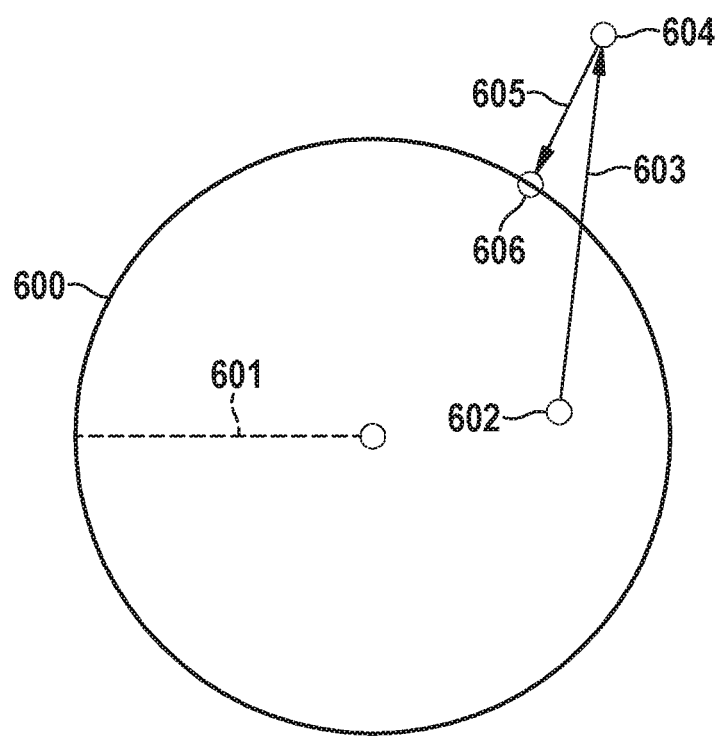
FIG. 6 shows a detailed example of how to project a perturbation to a set of allowed perturbations of a perturbation type.

It is noted that the steepest descent direction used to determine updated perturbation UPi may not correspond to the actual gradient. This is visualized, by way of example, in FIG. 5. Shown in FIG. 5 is a gradient 501. Step sizes of radius α for the $\ell_\infty$, $\ell_2$, and $\ell_1$-norms are shown as 510, 520, and 530, respectively. Steepest descent directions corresponding to the respective norms are shown as 511, 521, and 531, respectively. In this case, gradient direction 501 corresponds to steepest descent direction 521 of the $\ell_2$ norm but not to the directions for the $\ell_\infty$ and $\ell_1$ norms.

Continuing with FIG. 4, shown is an operation Proj, 480 which may determine updated perturbation UPi by projecting the perturbation $\delta_p^{(t)}$, UP updated with the determined update $v_p(\delta^{(t)})$, Ui to the set of allowed perturbations of perturbation type PTi. Such a projection may be denoted $\delta^{(t+1)} = \mathcal{P}_{\Delta_{p,\epsilon}}(\delta_p^{(t)} + v_p(\delta^{(t)}))$. For example, $\mathcal{P}_{\Delta_{p,\epsilon}}(\delta)$ may determine a projection that finds a perturbation δ closest in Euclidean space to input δ, e.g., $$\mathcal{P}_{\Delta_{p,\epsilon}}(\delta) = \operatorname*{argmin}_{\delta' \in \Delta_{p,\epsilon}} \|\delta - \delta'\|_2^2.$$

For example, FIG. 5 shows an example of steepest descent followed by a projection onto a perturbation region for an $\ell_2$ adversary. Shown in the figure is a projection to a subspace 600 bounded in $\ell_2$-norm by a bound $\epsilon$, 601, after a steepest descent step. Shown is a steepest descent step 603 in which perturbation $\delta^{(t)}$, 602 is updated to perturbation $\delta_p^{(t)} + v_p(\delta^{(t)})$, 604. Projection 605 projects updated perturbation 604 back to point 606 on the $\ell_2$-ball 600.

Returning to FIG. 4, various ways of projecting to a set of allowed perturbations of a perturbation type PTi are conventional and may be readily applied. For example, projecting a perturbation UP updated with a determined update Ui to a $\ell_\infty$-ball of allowed perturbations around a datapoint x may be performed by determining $$\mathcal{P}_{\Delta_{\infty,\epsilon}}(\delta) = \underset{[-\epsilon,\epsilon]}{\text{clip}}(\delta),$$

where clip denotes clipping the input to lie within the range [$-\epsilon$, $\epsilon$]. Projection to a $l_2$-ball may be performed as $$\mathcal{P}_{\Delta_{2,\epsilon}} = \epsilon \cdot \frac{\delta}{\max\{\epsilon, \|\delta\|_2\}}.$$

Projection to a $\ell_1$-ball may be performed as disclosed in J. Duchi et al., "Efficient projections onto the l1-ball for learning in high dimensions", Proceedings ICML '08 (incorporated herein by reference). Projection to a Wasserstein ball of perturbations defined by a maximal Wasserstein distance may be performed as disclosed in E. Wong et al., "Wasserstein Adversarial Examples via Projected Sinkhorn Iterations" (incorporated herein by reference insofar as the projection method of section 4.1 is concerned, and available at https://arxiv.org/abs/1902.07906).

In operation POpt, 451, based on selected set of training instances TI and determined perturbations UP, set of parameters PAR of the classification model may be updated to decrease the loss of the classification model for the training instances TI perturbed by the determined perturbations UP. For example, backpropagation may be performed, e.g., with stochastic gradient descent, to update the set of parameters PAR with gradient $$\Sigma_i \nabla_\theta \ell\,(f_\theta(x_i+\delta^*(x_i)), y_i),$$

where i sums over selected training instances TI and $x_i + \delta^*(x_i)$ denotes a selected training instance perturbed by a determined perturbation UP. For example, in the strong version of multi steepest descent, each selected training instance $x_i$ may be perturbed by a respective perturbation $\delta_i$; in the weak version, each selected training instance $x_i$ may be perturbed by the same perturbation $\delta$.

Optionally, as part of the inner iteration Desc., Proj., PSel, a classification of a training instance TI perturbed by the updated perturbation UP may be determined (not shown explicitly). If the classification of the perturbed training instance is different from a classification of the training instance, e.g., according to the training dataset TD or according to the classification model, the perturbation may be determined as the current updated perturbation UP, e.g., no more inner iterations may be performed to determine the updated perturbation. For example, the inner optimization may be stopped if a classification of each training instance TI is changed compared to the training dataset or classification model. This way, the inner optimization can be stopped if perturbations are found that are good enough to change the classification, in which case further optimization of the perturbations may not be expected to still greatly improve the perturbations.

By way of example, a procedure to train the classification model according to an embodiment is described below. The set of permutation types is denoted as S. A perturbation type is given by a pair $s=(v, \epsilon) \in S$, comprising a norm v and a bound $\epsilon$ on the set of allowed perturbations. Accordingly, a set of perturbations of an instance x allowed by such a perturbation type may be defined as $\Delta_{v,\epsilon}(x) = \{y | v(x-y) \le \epsilon\}$. The set of allowed perturbations of the multiple perturbation types may be $\Delta_S(x) = U_{(v,\epsilon) \in S} \Delta_{v,\epsilon}(x)$, for example. In this example, a perturbation is determined for a single training instance. Training the classification model $f(\cdot; \theta)$ may comprise, in an outer iteration of the training procedure, performing the following operations:

1. (DSel) Select an annotated data pair (x,y)
2. Determine a perturbed data training instance x'
   a. If $f(x; \theta) \ne y$: return x
   b. Let x'=x and N=0
   c. Update perturbation via steepest ascent x'=x'+$\delta^*$(x'), N=N+1:
      i. all $s=(v, e) \in S$, compute the worst-case adversarial perturbation, e.g., via steepest descent (Desc) to increase the loss function $\ell\,(f(x+\delta); \theta), y)$ and projection (Proj) to the $\Delta_{v,\epsilon}(x)$-ball ii. (PSel) Return $\delta^*(x) = \underset{\delta \in \{\delta_s(x)|s \in S\}}{\operatorname{argmax}} \ell(f(x+\delta;\theta), y)$ d. If $f(x'; \theta) \ne y$: return x'
   e. If $N \le N_{max}$: repeat
3. (POpt) Update parameters $\theta$ to decrease loss for perturbed instance x'

As shown in this example procedure in step 2d, if the classification $f(x'; \theta)$ of perturbed training instance x' is different from classification y according to the training dataset, the perturbation may be determined as the current perturbation and the current perturbed instance x' may be used to optimize set of parameters $\theta$.

As will be understood, the above procedure may be adapted such that, in the first step, multiple annotated data pairs are selected, e.g., a minibatch. In a strong variant, the selected annotated data pairs may be perturbed by determining a separate perturbation, e.g., executing step 2 separately, for each perturbation. In a weak variant, the selected annotated data pairs may be perturbed, by determining a single perturbation to apply to each selected annotated data pair, e.g., by executing step 2 by performing the projected gradient descent and the maximization over the combined annotated data pairs. For example, in steps 2a and 2d, the sets of perturbations may be returned as soon as the perturbation causes each of the selected annotated data pairs to be classified differently, or as soon as the perturbation causes at least one of the selected annotated data pairs to be classified differently, etc.

Another description of a multi steepest descent procedure according to an example embodiment is presented below.

Algorithm. Multi steepest descent for learning classifiers that are simultaneously robust to multiple $\ell_p$ attacks for $p \in S$, e.g., $S = \{\ell_\infty, \ell_2, \ell_1\}$.

Input: classifier $f_\theta$, data x, labels y
Parameters: $\epsilon_p$, $\beta_p$ for $p \in S$, maximum iterations T, loss function $\ell$ $\delta^{(0)}=0$
for t=0, ..., T-1 do
 for $p \in S$ do $$\delta_p^{(t+1)} = P_{\Delta_p, \epsilon_p}(\delta^{(t)} + v_p(\delta^{(t)}))$$

end for
 $\delta^{(t+1)}$=argmax$_{\delta_p^{(t+1)}}\ell$ ($f_\theta$(x+$\delta_p^{(t+1)}$), y)
end for
return $\delta^{(T)}$ Interestingly, as can be observed form this algorithm, after an iteration of multi steepest descent in which an update to the perturbation is determined, a projected descent direction may be chosen that maximizes a loss of the classification model for the training instances perturbed by the projected updates. Hence, multiple perturbation types may be taken into account at the same time.

Figure 7:
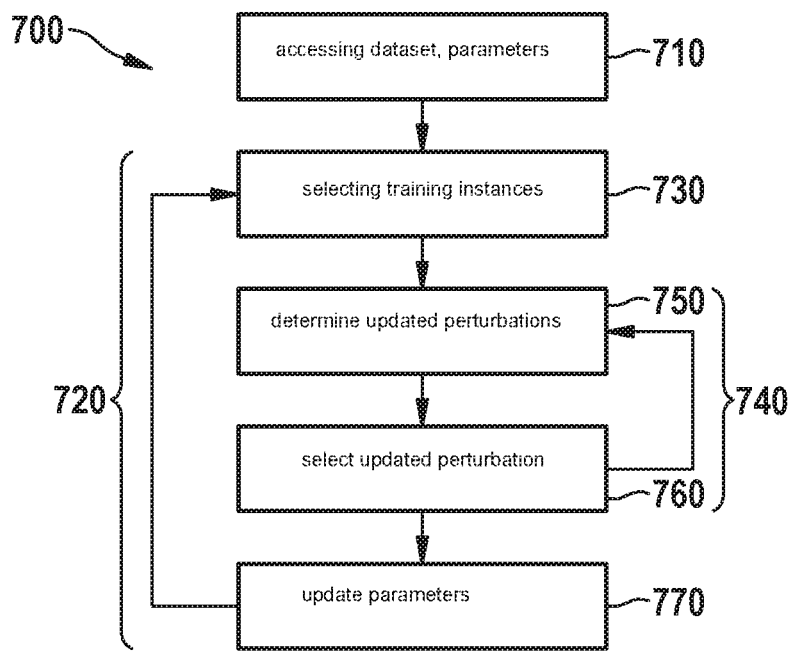
FIG. 7 shows a computer-implemented method of training a classification model to be robust against perturbations of multiple perturbation types.

FIG. 7 shows a block-diagram of computer-implemented method 700 of training a classification model to be robust against perturbations of multiple perturbation types. A perturbation type may define a set of allowed perturbations. The method 700 may correspond to an operation of the system 100 of FIG. 1. However, this is not a limitation, in that the method 700 may also be performed using another system, apparatus or device.

The method 700 may comprise, in an operation titled "ACCESSING DATASET, PARAMETERS", accessing 710 a training dataset and a set of parameters parametrizing the classification model, wherein the training dataset comprises multiple training instances. The method may further comprise, in an operation titled "TRAINING CLASSIFICATION MODEL", training 720 the classification model. Training the classification model may comprise performing one or more outer iterations. Method 700 may comprise, in an outer iteration, in an operation titled "SELECTING TRAINING INSTANCES", selecting 730 a set of training instances of the training dataset. Method 700 may further comprise, in the outer iteration, in an operation titled "DETERMINING PERTURBATIONS", determining 740 one or more perturbations for perturbing the set of selected training instances. The one or more perturbations may be selected among the sets of allowed perturbations of the multiple perturbation types to maximize a loss of the classification model for the set of selected training instances when perturbed by the one or more perturbations. Method 700 may also comprise, in the outer operation, in an operation titled "UPDATING PARAMETERS", updating 770 the set of parameters of the classification model to decrease the loss of the classification model for said perturbed one or more selected training instances.

Determining a perturbation as part of operation 740 may comprise performing one or more inner iterations. Method 700 may comprise, in an inner iteration, in an operation titled "DETERMINING UPDATED PERTURBATIONS", determining 750 updated perturbations allowed by respective perturbation types of the multiple perturbation types. Method 700 may also comprise, in the inner iteration, in an operation titled "SELECTING UPDATED PERTURBATION", selecting 760 an updated perturbation that most increases the loss of the classification model.

Figure 8:
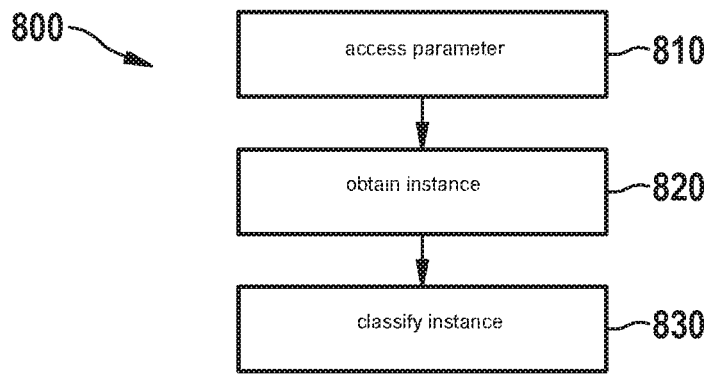
FIG. 8 shows a computer-implemented method of performing a classification robust against perturbations of multiple perturbation types.

FIG. 8 shows a block-diagram of computer-implemented method 800 of performing a classification robust against perturbations of multiple perturbation types. A perturbation type may define a set of allowed perturbations. The method 800 may correspond to an operation of the system 200 of FIG. 2 or system 300 of FIG. 3. However, this is not a limitation, in that the method 800 may also be performed using another system, apparatus or device.

Method 800 may comprise, in an operation titled "ACCESSING PARAMETERS", accessing 810 a set of parameters parametrizing a classification model. The classification model may be trained by, in an outer iteration:
 selecting a set of training instances of a training dataset;
 determining one or more perturbation for perturbing the set of selected training instances, the one or more perturbations being selected among the sets of allowed perturbations of the multiple perturbation types to maximize a loss of the classification model for the set of selected training instances when perturbed by the one or more perturbations; and
 updating the set of parameters of the classification model to decrease the loss of the classification model for said perturbed one or more selected training instances.

A perturbation may be determined by, in an inner iteration, determining updated perturbations allowed by respective perturbation types of the multiple perturbation types and selecting an updated perturbation that most increases the loss of the classification model.

Method 800 may further comprise, in an operation titled "OBTAINING INSTANCE", obtaining 820 an instance. Method 800 may further comprise, in an operation titled "CLASSIFYING INSTANCE", classifying 830 the instance according to the classification model.

It will be appreciated that, in general, the operations of method 700 of FIG. 7 and method 800 of FIG. 8 may be performed in any suitable order, e.g., consecutively, simultaneously, or a combination thereof, subject to, where applicable, a particular order being necessitated, e.g., by input/output relations.

Figure 9:
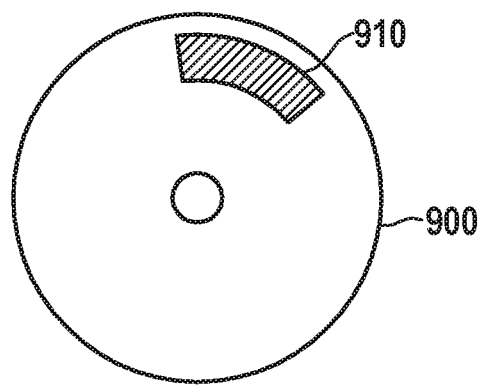
FIG. 9 shows a computer-readable medium comprising data.

The method(s) may be implemented on a computer as a computer implemented method, as dedicated hardware, or as a combination of both. As also illustrated in FIG. 9, instructions for the computer, e.g., executable code, may be stored on a computer readable medium 900, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc.

FIG. 9 shows an optical disc 900. Alternatively, the computer readable medium 900 may comprise transitory or non-transitory data 910 representing a set of parameters of a classification model as described elsewhere in this specification.

Figure 10:
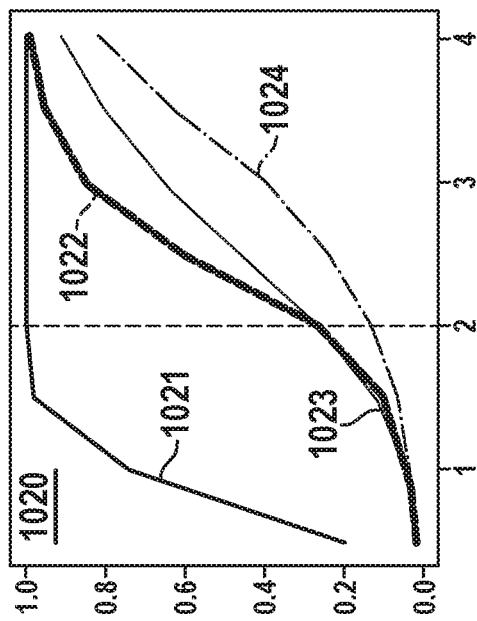
FIG. 10 shows error rates of various models when attacked by several types of adversaries.
Figure 10:
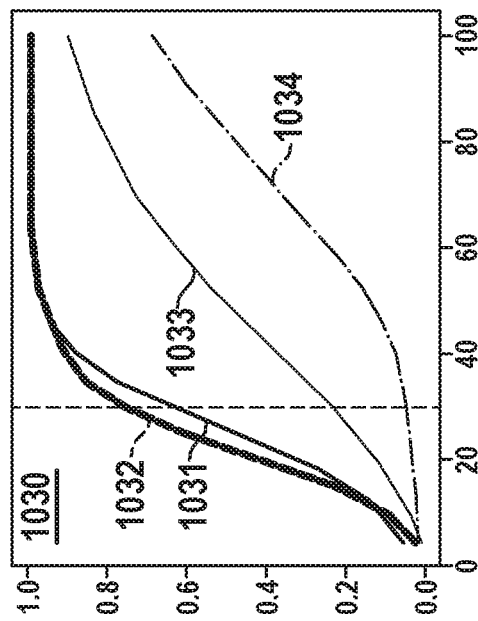
Figure 10:
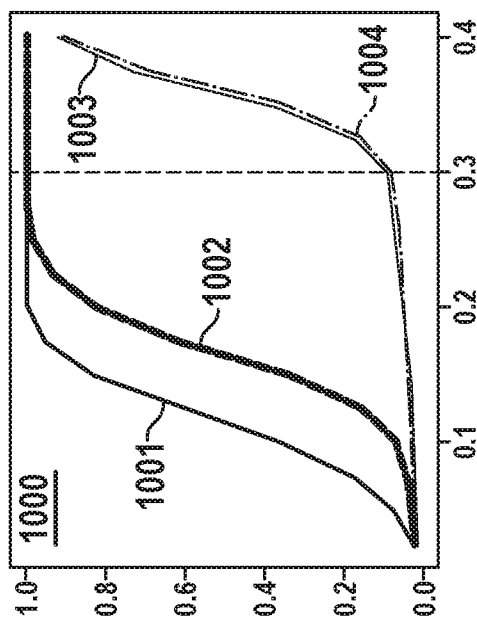
Figure 10:
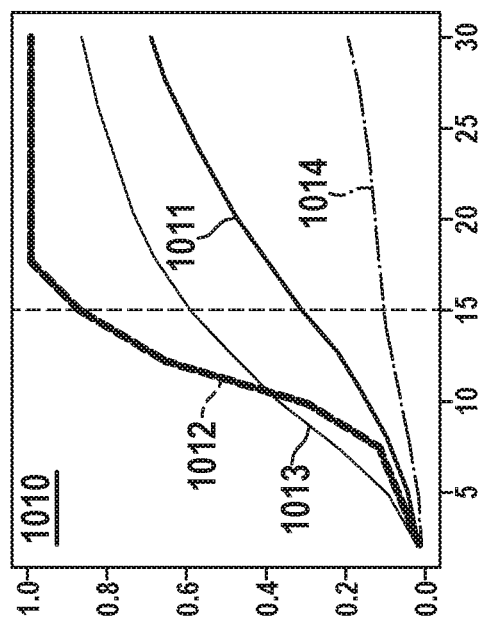

FIG. 10 shows experimental results of applying the techniques presented herein on the MNIST dataset (http://yann.lecun.com/exdb/mnist/). The experimental results are of a classification model trained according to an embodiment to be robust against perturbations of $\ell_\infty$, $\ell_2$ and $\ell_1$ types. The inventors have found that the trained classification model outperforms classification models trained to be robust against a single perturbation type. Interestingly, even when compared to performance against an individual attack of models trained against that particular attack, the inventors found that classification models according to an embodiment defend just as well or even better.

In the experiments, the classification model is an image classifier comprising a four-layer convolutional network with two convolutional layers with 32 and 64 5×5 filters and 2 units of padding, followed by a fully connected layer with 1024 hidden units. Both convolutional layers are followed by 2×2 Max Pooling layers and ReLU activations. The optimizer used for all experiments is Adam, and the learning rate is initiated at 0.001 and reduced periodically every 5 epochs by a factor of 10. To avoid getting stuck in local minima, a reduced value of $\epsilon$ is used for the first epoch of the training, and it is increased directly to the final value afterwards.

The classification model is trained using multi steepest descent as described herein. The network is trained for a total of 8 epochs, using 100 iterations of MSD on each minibatch. The first epoch is trained at a reduced $\epsilon=(0.1,1,5)$ and then for the next 6 epochs at $\epsilon=(0.3,2,15)$. These epochs are trained with the weaker version of MSD, and a final epoch is then trained with the stronger version of MSD for fine-tuning. The standard test error for the model is 1.32%.

As a comparison, also three typical adversarially trained classification models are trained using each of the three threat models individually. The same parameters are used as for the MSD model; however, these models are trained longer, taking up to 30 epochs before overfitting is observed and no substantial improvement in generalization occurs.

To evaluate robustness of the classification models, they are attacked with 100 projected gradient descent PGD iterations of the $\ell_\infty$ adversary, and 2000 iterations of the $\ell_1$ and $\ell_2$ adversaries. The models are also evaluated against an $\ell_0$ adversary, where the adversary may change one pixel per iteration for up to $\epsilon$ iterations. It is noted that $\ell_1$ attacks form a superset of $\ell_0$ attacks.

Graph 1000 shows the error rate of various classification models when attacked by an $\ell_\infty$ adversary. Curves 1001, 1002, and 1003 are error rates of classification models trained against a $\ell_1$, $\ell_2$, and $\ell_\infty$ adversary, respectively. Curve 1004 is the error rate of a classification model trained to be robust against multiple perturbation types consisting of $\ell_1$, $\ell_2$, and $\ell_\infty$ adversaries using the techniques presented herein.

Graph 1010 shows the error rate of various classification models when attacked by an $\ell_1$ adversary. Curves 1011, 1012, and 1013 are error rates of classification models trained against a $\ell_1$, $\ell_2$, and $\ell_\infty$ adversary, respectively. Curve 1014 is the error rate of a classification model trained to be robust against multiple perturbation types consisting of $\ell_1$, $\ell_2$, and $\ell_\infty$ adversaries using the techniques presented herein.

Graph 1020 shows the error rate of various classification models when attacked by an $\ell_2$ adversary. Curves 1021, 1022, and 1023 are error rates of classification models trained against a $\ell_1$, $\ell_2$, and $\ell_\infty$ adversary, respectively. Curve 1024 is the error rate of a classification model trained to be robust against multiple perturbation types consisting of $\ell_1$, $\ell_2$, and $\ell_\infty$ adversaries using the techniques presented herein.

Graph 1030 shows the error rate of various classification models when attacked by an $\ell_0$ adversary. Curves 1031, 1032, and 1033 are error rates of classification models trained against a $\ell_1$, $\ell_2$, and $\ell_\infty$ adversary, respectively. Curve 1034 is the error rate of a classification model trained to be robust against multiple perturbation types consisting of $\ell_1$, $\ell_2$, and $\ell_\infty$ adversaries using the techniques presented herein. It is noted that none of the error models have been explicitly trained to be robust against this type of adversary.

It is observed from the adversarial curves of graphs 1000-1020 that the adversarial model trained according to an embodiment has obtained a relatively strong degree of robustness against all the threat models it was trained against. The model according to an embodiment performs at least as well as the other models, and in most cases better. A strong degree of robustness against $\ell_0$ attacks is also observed in graph 1030. In total, we see that the proposed training techniques succeed in achieving significant robustness against the union of attacks on the MNIST dataset. For example, for $(\epsilon_\infty, \epsilon_2, \epsilon_1)=(0.3,2,15)$, the adversarial error of our model is 7.1%, 13.5%, and 11.4% respectively Interestingly, it is observed that models trained against a union of perturbation models are actually equivalently or more robust against individual attacks than models trained specifically against that particular attack. For example, this is observed by comparing curves 1003 and 1004; curves 1011 and 1014; and curves 1022 and 1024. Accordingly, the present training techniques and resulting classification models may not just provide improved overall robustness but also improved robustness against specific perturbation types.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device including several elements, several of these elements may be embodied by one and the same item of hardware. The mere fact that certain measures are recited in mutually separately does not indicate that a combination of these measures cannot be used to advantage.

What is claimed is:

1. A system for training a classification model to be robust against perturbations of multiple perturbation types, a perturbation type defining a set of allowed perturbations, the system comprising:
   a data interface for accessing a training dataset and a set of parameters parametrizing the classification model, wherein the training dataset includes multiple training instances; and
   a processor subsystem configured to train the classification model by, in an outer iteration:
      selecting a set of training instances of the training dataset;
      determining one or more perturbations for perturbing the set of selected training instances, the one or more perturbations being selected among the sets of allowed perturbations of the multiple perturbation types to maximize a loss of the classification model for the set of selected training instances when perturbed by the one or more perturbations; and updating the set of parameters of the classification model to decrease the loss of the classification model for the perturbed one or more selected training instances;

wherein the processor subsystem is configured to determine a perturbation by, in an inner iteration, determining updated perturbations allowed by respective perturbation types of the multiple perturbation types and selecting an updated perturbation that most increases the loss of the classification model;

wherein the processor subsystem is configured to determine a respective perturbation for perturbing each respective selected training instance or to determine a single perturbation for perturbing the selected training instances;

wherein the processor subsystem is configured to train the classification model by performing at least one or more first outer iterations followed by one or more second outer iterations, the processor subsystem being configured to determine a single perturbation in each first outer iteration and to determine a respective perturbation in each second outer iteration;

wherein the processor subsystem is configured to determine an updated perturbation allowed by a respective perturbation type by:
 determining an update to the perturbation to increase the loss of the classification model for the set of training instances; and
 projecting the perturbation updated with said update to the set of allowed perturbations of the perturbation type; and wherein the processor subsystem is configured to determine the perturbation by, in the inner iteration, determining a classification of a training instance perturbed by the updated perturbation, and to determine the perturbation as the updated perturbation if the classification of said perturbed training instance is different from a classification of the training instance.

2. The system according to claim 1, wherein the processor subsystem is configured to determine the update to the perturbation by gradient ascent or steepest ascent.

3. The system according to claim 1, wherein a perturbation type of the multiple perturbation types is defined by a norm and a bound, the set of allowed perturbations of the perturbation type being comprised in a set of perturbations for which the norm does not exceed the bound.

4. The system according to claim 1, wherein a perturbation type of the multiple perturbations is defined by a maximal Wasserstein distance.

5. The system according to claim 1, wherein the classification model is an image classifier, and the training dataset comprises multiple training images as the training instances.

6. A system for performing a classification robust against perturbations of multiple perturbation types, a perturbation type defining a set of allowed perturbations, the system comprising:
 a data interface for accessing a set of parameters parametrizing a classification model, the classification model being trained by a first processor subsystem, in an outer iteration:
  selecting a set of training instances of a training dataset;
  determining one or more perturbation for perturbing the set of selected training instances, the one or more perturbations being selected among the sets of allowed perturbations of the multiple perturbation types to maximize a loss of the classification model for the set of selected training instances when perturbed by the one or more perturbations; and
  updating the set of parameters of the classification model to decrease the loss of the classification model for said perturbed one or more selected training instances, wherein a perturbation is determined by, in an inner iteration, determining updated perturbations allowed by respective perturbation types of the multiple perturbation types and selecting an updated perturbation that most increases the loss of the classification model; and a second processor subsystem configured to obtain an instance and classify the instance according to the classification model based on the set of parameters;

wherein the first processor subsystem is configured to determine a respective perturbation for perturbing each respective selected training instance or to determine a single perturbation for perturbing the selected training instances;

wherein the first processor subsystem is configured to train the classification model by performing at least one or more first outer iterations followed by one or more second outer iterations, the processor subsystem being configured to determine a single perturbation in each first outer iteration and to determine a respective perturbation in each second outer iteration;

wherein the first processor system is configured to determine an updated perturbation allowed by a respective perturbation type by:
  determining an update to the perturbation to increase the loss of the classification model for the set of training instances; and
  projecting the perturbation updated with said update to the set of allowed perturbations of the perturbation type; and wherein the first processor system is configured to determine the perturbation by, in the inner iteration, determining a classification of a training instance perturbed by the updated perturbation, and to determine the perturbation as the updated perturbation if the classification of said perturbed training instance is different from a classification of the training instance.

7. An automotive control system for controlling a vehicle, comprising:
 a camera interface for obtaining, from a camera, an image of an environment of the vehicle;
 an actuator interface for providing, to an actuator, actuator data causing the actuator to effect an action to control the vehicle; and
 a system for performing a classification robust against perturbations of multiple perturbation types, a perturbation type defining a set of allowed perturbations, the system for performing the classification including:
  a data interface for accessing a set of parameters parametrizing a classification model, the classification model being trained by a first processor subsystem, in an outer iteration:
   selecting a set of training instances of a training dataset;
   determining one or more perturbation for perturbing the set of selected training instances, the one or more perturbations being selected among the sets of allowed perturbations of the multiple perturbation types to maximize a loss of the classification model for the set of selected training instances when perturbed by the one or more perturbations; and updating the set of parameters of the classification model to decrease the loss of the classification model for said perturbed one or more selected training instances, wherein a perturbation is determined by, in an inner iteration, determining updated perturbations allowed by respective perturbation types of the multiple perturbation types and selecting an updated perturbation that most increases the loss of the classification model; and a second processor subsystem configured to obtain an instance and classify the instance according to the classification model based on the set of parameters;

wherein the classification model is an image classifier, and wherein the second processor subsystem of the system for performing the classification is configured to classify the image according to the classification model to detect an object in the environment of the vehicle, to determine actuator data to control the vehicle based at least on part on said detection, and to provide the actuator data to the actuator via the actuator interface;

wherein the first processor subsystem is configured to determine a respective perturbation for perturbing each respective selected training instance or to determine a single perturbation for perturbing the selected training instances;

wherein the first processor subsystem is configured to train the classification model by performing at least one or more first outer iterations followed by one or more second outer iterations, the processor subsystem being configured to determine a single perturbation in each first outer iteration and to determine a respective perturbation in each second outer iteration;

wherein the first processor subsystem is configured to determine an updated perturbation allowed by a respective perturbation type by:
  determining an update to the perturbation to increase the loss of the classification model for the set of training instances; and
  projecting the perturbation updated with said update to the set of allowed perturbations of the perturbation type; and wherein the first processor subsystem is configured to determine the perturbation by, in the inner iteration, determining a classification of a training instance perturbed by the updated perturbation, and to determine the perturbation as the updated perturbation if the classification of said perturbed training instance is different from a classification of the training instance.

8. A computer-implemented method of training a classification model to be robust against perturbations of multiple perturbation types, a perturbation type defining a set of allowed perturbations, the method comprising the following steps:

accessing a training dataset and a set of parameters parametrizing the classification model, wherein the training dataset includes multiple training instances; and training the classification model by, in an outer iteration:
  selecting a set of training instances of the training dataset;
  determining one or more perturbations for perturbing the set of selected training instances, the one or more perturbations being selected among the sets of allowed perturbations of the multiple perturbation types to maximize a loss of the classification model for the set of selected training instances when perturbed by the one or more perturbations; and
  updating the set of parameters of the classification model to decrease the loss of the classification model for said perturbed one or more selected training instances;

wherein determining a perturbation includes, in an inner iteration, determining updated perturbations allowed by respective perturbation types of the multiple perturbation types and selecting an updated perturbation that most increases the loss of the classification model;

wherein a respective perturbation for perturbing each respective selected training instance is determined or a single perturbation for perturbing the selected training instances is determined;

wherein the training of the first classification model includes performing at least one or more first outer iterations followed by one or more second outer iterations, the processor subsystem being configured to determine a single perturbation in each first outer iteration and to determine a respective perturbation in each second outer iteration;

wherein an updated perturbation allowed by a respective perturbation type is determined by:
  determining an update to the perturbation to increase the loss of the classification model for the set of training instances; and
  projecting the perturbation updated with said update to the set of allowed perturbations of the perturbation type; and wherein the perturbation is determined by, in the inner iteration, determining a classification of a training instance perturbed by the updated perturbation, and the perturbation is determined as the updated perturbation if the classification of said perturbed training instance is different from a classification of the training instance.

9. A computer-implemented method of performing a classification robust against perturbations of multiple perturbation types, a perturbation type defining a set of allowed perturbations, the method comprising the following steps:

accessing a set of parameters parametrizing a classification model, the classification model being trained by, in an outer iteration:
  selecting a set of training instances of a training dataset;
  determining one or more perturbation for perturbing the set of selected training instances, the one or more perturbations being selected among the sets of allowed perturbations of the multiple perturbation types to maximize a loss of the classification model for the set of selected training instances when perturbed by the one or more perturbations; and
  updating the set of parameters of the classification model to decrease the loss of the classification model for said perturbed one or more selected training instances, wherein a perturbation is determined by, in an inner iteration, determining updated perturbations allowed by respective perturbation types of the multiple perturbation types and selecting an updated perturbation that most increases the loss of the classification model;

obtaining an instance; and
classifying the instance according to the classification model;

wherein a respective perturbation for perturbing each respective selected training instance is determined or a single perturbation for perturbing the selected training instances is determined;

wherein the training of the first classification model includes performing at least one or more first outer iterations followed by one or more second outer iterations, the processor subsystem being configured to determine a single perturbation in each first outer iteration and to determine a respective perturbation in each second outer iteration;

wherein an updated perturbation allowed by a respective perturbation type is determined by:

determining an update to the perturbation to increase the loss of the classification model for the set of training instances; and projecting the perturbation updated with said update to the set of allowed perturbations of the perturbation type; and wherein the perturbation is determined by, in the inner iteration, determining a classification of a training instance perturbed by the updated perturbation, and the perturbation is determined as the updated perturbation if the classification of said perturbed training instance is different from a classification of the training instance.

10. A non-transitory computer-readable medium on which is stored data representing instructions for training a classification model to be robust against perturbations of multiple perturbation types, a perturbation type defining a set of allowed perturbations, the stored data representing the instructions, when executed by a processor system, causing the processor to perform the following steps:

accessing a training dataset and a set of parameters parametrizing the classification model, wherein the training dataset includes multiple training instances; and training the classification model by, in an outer iteration:
selecting a set of training instances of the training dataset;
determining one or more perturbations for perturbing the set of selected training instances, the one or more perturbations being selected among the sets of allowed perturbations of the multiple perturbation types to maximize a loss of the classification model for the set of selected training instances when perturbed by the one or more perturbations; and
updating the set of parameters of the classification model to decrease the loss of the classification model for said perturbed one or more selected training instances;

wherein determining a perturbation includes, in an inner iteration, determining updated perturbations allowed by respective perturbation types of the multiple perturbation types and selecting an updated perturbation that most increases the loss of the classification model;

wherein a respective perturbation for perturbing each respective selected training instance is determined or a single perturbation for perturbing the selected training instances is determined;

wherein the training of the first classification model includes performing at least one or more first outer iterations followed by one or more second outer iterations, the processor subsystem being configured to determine a single perturbation in each first outer iteration and to determine a respective perturbation in each second outer iteration;

wherein an updated perturbation allowed by a respective perturbation type is determined by:

determining an update to the perturbation to increase the loss of the classification model for the set of training instances; and projecting the perturbation updated with said update to the set of allowed perturbations of the perturbation type; and wherein the perturbation is determined by, in the inner iteration, determining a classification of a training instance perturbed by the updated perturbation, and the perturbation is determined as the updated perturbation if the classification of said perturbed training instance is different from a classification of the training instance.

11. A non-transitory computer-readable medium on which is stored data representing instructions for performing a classification robust against perturbations of multiple perturbation types, a perturbation type defining a set of allowed perturbations, the stored data representing instructions, when executed by a processor system, causing the processor system to perform the following steps:

accessing a set of parameters parametrizing a classification model, the classification model being trained by, in an outer iteration:
selecting a set of training instances of a training dataset;
determining one or more perturbation for perturbing the set of selected training instances, the one or more perturbations being selected among the sets of allowed perturbations of the multiple perturbation types to maximize a loss of the classification model for the set of selected training instances when perturbed by the one or more perturbations; and
updating the set of parameters of the classification model to decrease the loss of the classification model for said perturbed one or more selected training instances, wherein a perturbation is determined by, in an inner iteration, determining updated perturbations allowed by respective perturbation types of the multiple perturbation types and selecting an updated perturbation that most increases the loss of the classification model;

obtaining an instance; and classifying the instance according to the classification model;

wherein a respective perturbation for perturbing each respective selected training instance is determined or a single perturbation for perturbing the selected training instances is determined;

wherein the training of the first classification model includes performing at least one or more first outer iterations followed by one or more second outer iterations, the processor subsystem being configured to determine a single perturbation in each first outer iteration and to determine a respective perturbation in each second outer iteration;

wherein an updated perturbation allowed by a respective perturbation type is determined by:

determining an update to the perturbation to increase the loss of the classification model for the set of training instances; and projecting the perturbation updated with said update to the set of allowed perturbations of the perturbation type; and wherein the perturbation is determined by, in the inner iteration, determining a classification of a training instance perturbed by the updated perturbation, and the perturbation is determined as the updated perturbation if the classification of said perturbed training instance is different from a classification of the training instance.

* * * * *